(12) United States Patent
Chimento et al.

(10) Patent No.: US 12,195,096 B2
(45) Date of Patent: Jan. 14, 2025

(54) PLATFORM ASSEMBLY FOR VEHICLE

(71) Applicant: Ford Global Technologies, LLC, Dearborn, MI (US)

(72) Inventors: Vincent A. Chimento, Plymouth, MI (US); Jack Marchlewski, Saline, MI (US); Shawn Michael Morgans, Chelsea, MI (US); Dragan B. Stojkovic, Taylor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 390 days.

(21) Appl. No.: 17/843,158

(22) Filed: Jun. 17, 2022

(65) Prior Publication Data
US 2023/0406417 A1   Dec. 21, 2023

(51) Int. Cl.
*B62D 33/02*   (2006.01)
*B62D 33/08*   (2006.01)

(52) U.S. Cl.
CPC ............. *B62D 33/02* (2013.01); *B62D 33/08* (2013.01)

(58) Field of Classification Search
CPC .... B62D 33/02; B62D 33/08; B62D 25/2054; B60R 2011/0084; B60R 2011/0082; B60R 13/01; B60P 3/40
USPC ......... 296/26.01, 26.02, 183.1, 26.08, 26.09, 296/26.1; 414/522; 108/44; D12/98
See application file for complete search history.

(56) References Cited

U.S. PATENT DOCUMENTS

| | | | | | |
|---|---|---|---|---|---|
| 2,852,303 | A | * | 9/1958 | Hopson | B62D 33/08 296/50 |
| 3,132,755 | A | * | 5/1964 | Greenslate | B60R 5/04 224/403 |
| 4,124,131 | A | * | 11/1978 | Torneback | B60P 1/00 92/96 |
| 5,649,731 | A | * | 7/1997 | Tognetti | B60P 1/003 296/57.1 |
| 5,938,262 | A | * | 8/1999 | Mills | B60P 3/40 296/26.09 |
| 6,065,792 | A | * | 5/2000 | Sciullo | B60P 1/003 414/522 |
| 6,464,274 | B2 | * | 10/2002 | Mink | B60P 1/003 414/522 |
| 6,491,331 | B1 | * | 12/2002 | Fox | B62D 33/0273 224/403 |

(Continued)

FOREIGN PATENT DOCUMENTS

| | | | | |
|---|---|---|---|---|
| CN | 204222993 U | * | 3/2015 | ............... B60J 7/10 |
| FR | 2885572 A1 | * | 11/2006 | ............... B60R 5/04 |
| FR | 2885572 | | 1/2008 | |

*Primary Examiner* — Amy R Weisberg
*Assistant Examiner* — Hitney Nicole Francis
(74) *Attorney, Agent, or Firm* — Burris Law, PLLC (57) ABSTRACT

A platform assembly for a cargo area of a vehicle includes a floor panel and a cover panel. The floor panel includes a main section slidable between a rest position in which the main section is substantially within the cargo area of the vehicle and an extended position in which the main section extends beyond the cargo area of the vehicle. An opening in the floor panel is exposed when the main section is in the extended position. The cover panel is movable between a stowed position and a deployed position. The cover panel is configured to cover the opening exposed in the floor panel when the main section is in the deployed position.

20 Claims, 10 Drawing Sheets

(56) References Cited

U.S. PATENT DOCUMENTS

| | | | |
|---|---|---|---|
| 6,659,524 B1 * | 12/2003 | Carlson | B60P 1/003 414/522 |
| 6,709,038 B2 * | 3/2004 | Bienert | B60R 5/04 296/26.11 |
| 6,883,849 B2 * | 4/2005 | Hebert | B60P 1/003 224/403 |
| 7,111,887 B2 * | 9/2006 | Cooley | B60P 3/14 296/37.6 |
| 7,121,603 B2 | 10/2006 | Stevenson et al. | |
| 7,159,917 B2 * | 1/2007 | Haaberg | B60P 1/003 224/403 |
| 7,338,104 B1 * | 3/2008 | Bejin | B62D 33/0273 224/403 |
| 7,354,090 B1 * | 4/2008 | Pomorski | B60P 3/40 296/26.11 |
| 7,416,234 B2 * | 8/2008 | Bequette | B60P 1/003 414/522 |
| 7,445,263 B1 * | 11/2008 | Bluhm | B60R 5/041 296/26.09 |
| 7,513,552 B2 * | 4/2009 | Carvalho | B60P 1/431 296/26.09 |
| 7,628,439 B1 * | 12/2009 | Strong | B62D 33/0273 296/57.1 |
| 7,712,812 B2 * | 5/2010 | Gagliano | B60P 1/003 414/522 |
| 7,967,356 B2 * | 6/2011 | Stackpole | B62D 33/0273 296/26.08 |
| 9,493,195 B1 * | 11/2016 | Willis | B62D 53/067 |
| 10,532,683 B1 * | 1/2020 | Bowman | B60P 1/003 |
| 10,919,428 B2 * | 2/2021 | Wallace | B60R 5/041 |
| 11,753,086 B2 * | 9/2023 | Harmon | B60P 7/135 296/26.11 |
| 11,904,951 B2 * | 2/2024 | Harmon | B62D 33/0273 |
| 11,904,952 B2 * | 2/2024 | Harmon | B60R 13/01 |
| 11,951,948 B2 * | 4/2024 | Harmon | B60R 3/02 |
| 2002/0109368 A1 * | 8/2002 | Mink | B60P 1/003 108/44 |
| 2002/0140245 A1 * | 10/2002 | Coleman, II | B60R 5/04 296/26.09 |
| 2013/0341949 A1 | 12/2013 | Bernthisel | |
| 2015/0367768 A1 * | 12/2015 | Verwys | B60P 3/06 414/537 |
| 2016/0214522 A1 | 7/2016 | Marshall | |
| 2019/0202332 A1 * | 7/2019 | Tovani | B60N 3/001 |
| 2023/0256891 A1 * | 8/2023 | Harmon | B62D 33/08 296/26.08 |
| 2023/0256910 A1 * | 8/2023 | Harmon | B62D 33/0273 296/62 |
| 2023/0257031 A1 * | 8/2023 | Harmon | B60R 11/06 |
| 2023/0257034 A1 * | 8/2023 | Harmon | B60R 5/041 296/26.09 |

\* cited by examiner

PLATFORM ASSEMBLY FOR VEHICLE

FIELD

The present disclosure relates to a platform assembly of a vehicle and a vehicle having a platform assembly.

BACKGROUND

The statements in this section merely provide background information related to the present disclosure and may not constitute prior art.

Many vehicles, such as pickup trucks, include a cargo area for transporting cargo. In a pickup truck, for example, the cargo area is defined by a cargo bed constructed of a floor, front wall, two sidewalls and a tailgate. The tailgate is pivotable between a closed position and an open position. In the closed position, the tailgate is generally vertically oriented to at least partially enclosed the cargo area. In the open position, the tailgate is generally horizontally oriented so as to allow access to the cargo area from a rear of the cargo bed. Other vehicles, such as sport-utility vehicles and minivans, also include a cargo area accessible through a rear body opening.

SUMMARY

This section provides a general summary of the disclosure and is not a comprehensive disclosure of its full scope or all of its features.

In one form, the present disclosure provides a platform assembly for a cargo area of a vehicle that includes a floor panel and a cover panel. The floor panel includes a main section slidable between a rest position in which the main section is substantially within the cargo area of the vehicle and an extended position in which the main section extends beyond the cargo area of the vehicle. An opening in the floor panel is exposed when the main section is in the extended position. The cover panel is movable between a stowed position and a deployed position. The cover panel is configured to cover the opening exposed in the floor panel when the main section is in the deployed position.

In variations of the platform assembly of the above paragraph, which may be implemented individually or in any combination: a rail assembly includes a plurality of first tracks and a plurality of second tracks, the first tracks are configured to be fixed to cross bars underneath the floor panel and the second tracks are mounted to an underside of the main section and slidably received in respective first tracks; the underside of the main section includes grooves, the second tracks are disposed in respective grooves of the main section; the floor pan comprises end sections disposed on opposing sides of the main section, the main section is slidable relative to the end sections; the end sections are flush with the main section; the cover panel comprises a first panel and a second panel, the first panel is configured to be hinged to the vehicle and the second panel is hinged to the first panel and the main section; the first panel and the second panel are in a stacked arrangement when the cover panel is in the stowed position and are coplanar with each other when the cover panel is in the deployed position; the first panel and the second panel are in a stacked arrangement when the cover panel is in the stowed position and are flush with the main section when the cover panel is in the deployed position; the first and second panels extend in a vertical direction when the cover panel is in the stowed position and extend in a horizontal direction when the cover panel is in the deployed position; a latch assembly is associated with the main section and moveable between a latched state in which the main section is inhibited from sliding to the extended position and an unlatched state in which the main section is allowed to slide to the extended position; a motor assembly is operable to drive the main section between the rest position and the extended position; and the main section comprises elongated stiffening ridges.

In another form, the present disclosure provides a platform assembly for a cargo area of a vehicle that includes a floor panel, a rail assembly and a cover panel. The floor panel includes a main section slidable between a rest position in which the main section is configured to be substantially within the cargo area of the vehicle and an extended position in which the main section is configured to extend beyond the cargo area of the vehicle. An opening in the floor panel is exposed when the main section is in the extended position. The rail assembly includes a plurality of first tracks and a plurality of second tracks. The first tracks are configured to be fixed to cross bars underneath the floor panel and the second tracks are mounted to an underside of the main section and slidably received in respective first tracks. The cover panel is movable between a stowed position and a deployed position. The cover panel is configured to cover the opening exposed in the floor panel when the main section is in the deployed position.

In yet another form, the present disclosure provides a vehicle that includes a plurality of side walls and a platform assembly. The side walls define a cargo area. The platform assembly includes a floor panel, a rail assembly and a cover panel. The floor panel includes a main section slidable between a rest position in which the main section is configured to be substantially within the cargo area of the vehicle and an extended position in which the main section is configured to extend beyond the cargo area of the vehicle. An opening in the floor panel is exposed when the main section is in the extended position. The rail assembly includes a plurality of first tracks and a plurality of second tracks. The first tracks are configured to be fixed to cross bars underneath the floor panel and the second tracks are mounted to an underside of the main section and slidably received in respective first tracks. The cover panel is movable between a stowed position and a deployed position. The cover panel is configured to cover the opening exposed in the floor panel when the main section is in the deployed position.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
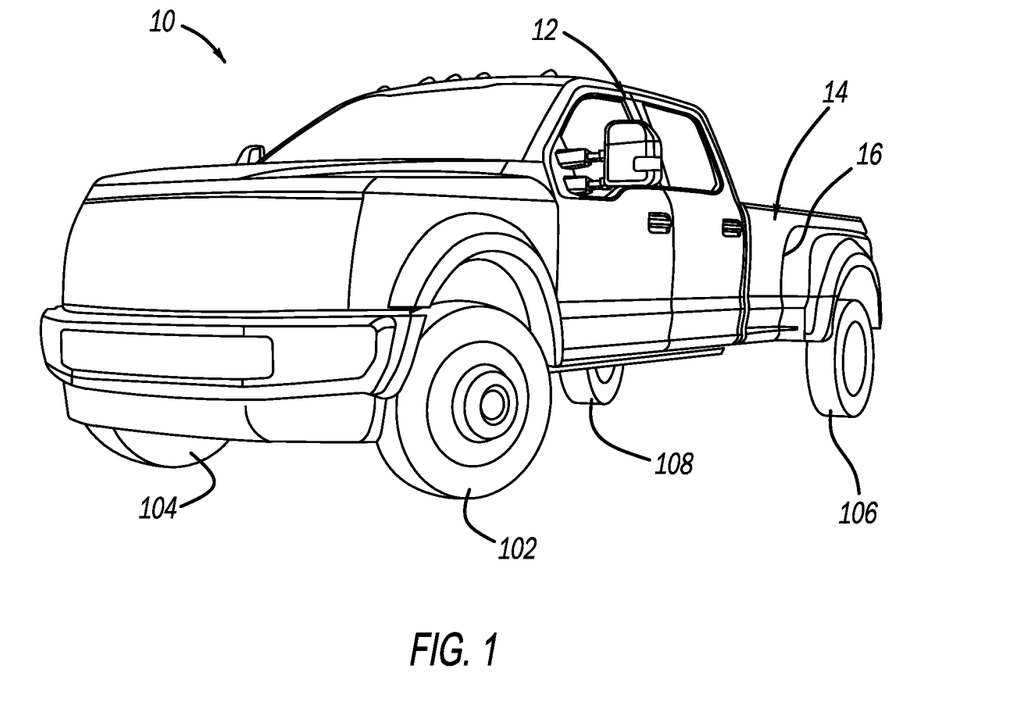
FIG. 1 is a perspective of a vehicle including a platform assembly according to the principles of the present disclosure.

With reference to FIG. 1, a vehicle 10 such as a pick-up truck, for example, is illustrated. The vehicle 10 includes a cab 12, a plurality of wheels 102, 104, 106, 108, and a cargo bed or component 14. The cargo bed 14 extends from the cab 12 and includes a plurality of side walls 16, a tailgate (not shown), and a platform assembly 18, which in this form is a floor platform assembly. The plurality of side walls 16 extend from an aft end of the cab 12. The tailgate is coupled to the side walls 16 and is pivotable about a horizontal axis (not shown) between a closed position and an open position. When the tailgate is in the closed position, the tailgate cooperates with the side walls 16 to define a partially enclosed cargo area 24. When the tailgate is in the open position, the side walls 16 define an opening to the cargo area 24. Cargo such as 2×4 s, piping, tubing and other materials to be transported from a facility to a jobsite or dwelling, for example, may be stored and transported in the cargo area 24. In some forms, the vehicle 10 may be a cargo van (not shown), among other types of vehicles, by way of example.

Figure 2:
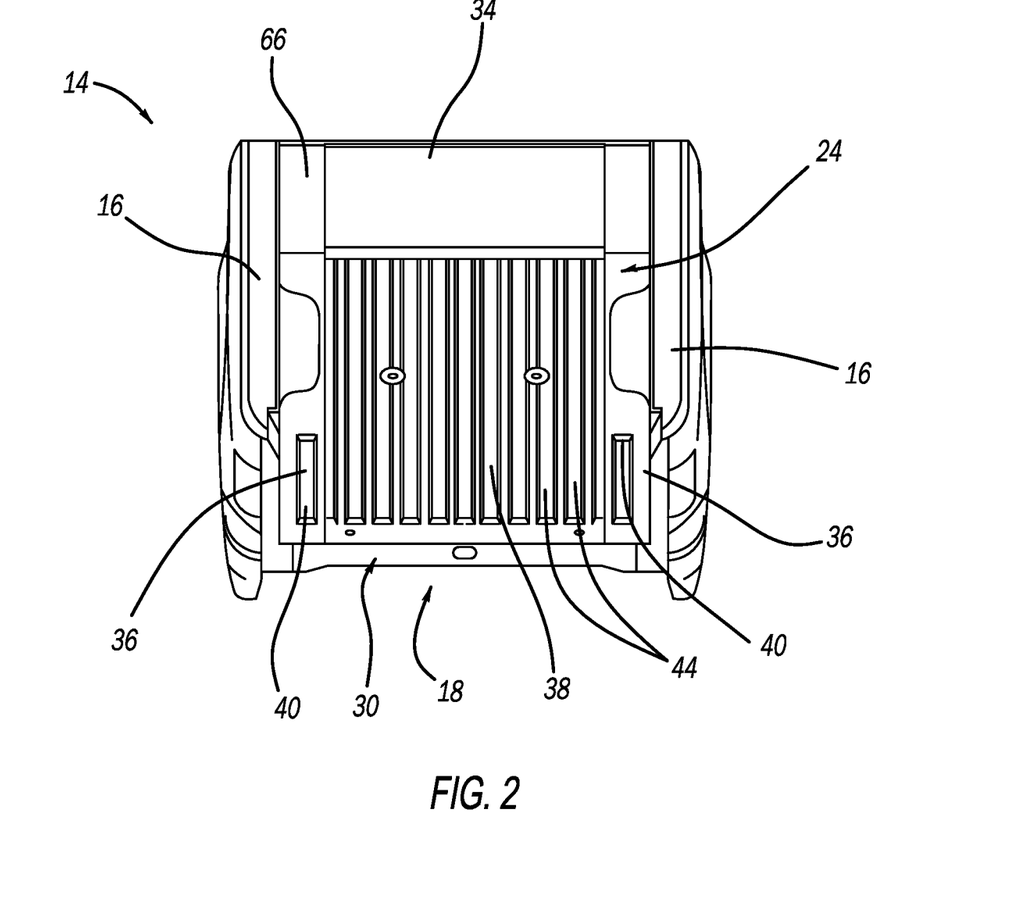
FIG. 2 is a top perspective view of the platform assembly of FIG. 1 comprising a main section in a rest position.
Figure 3:
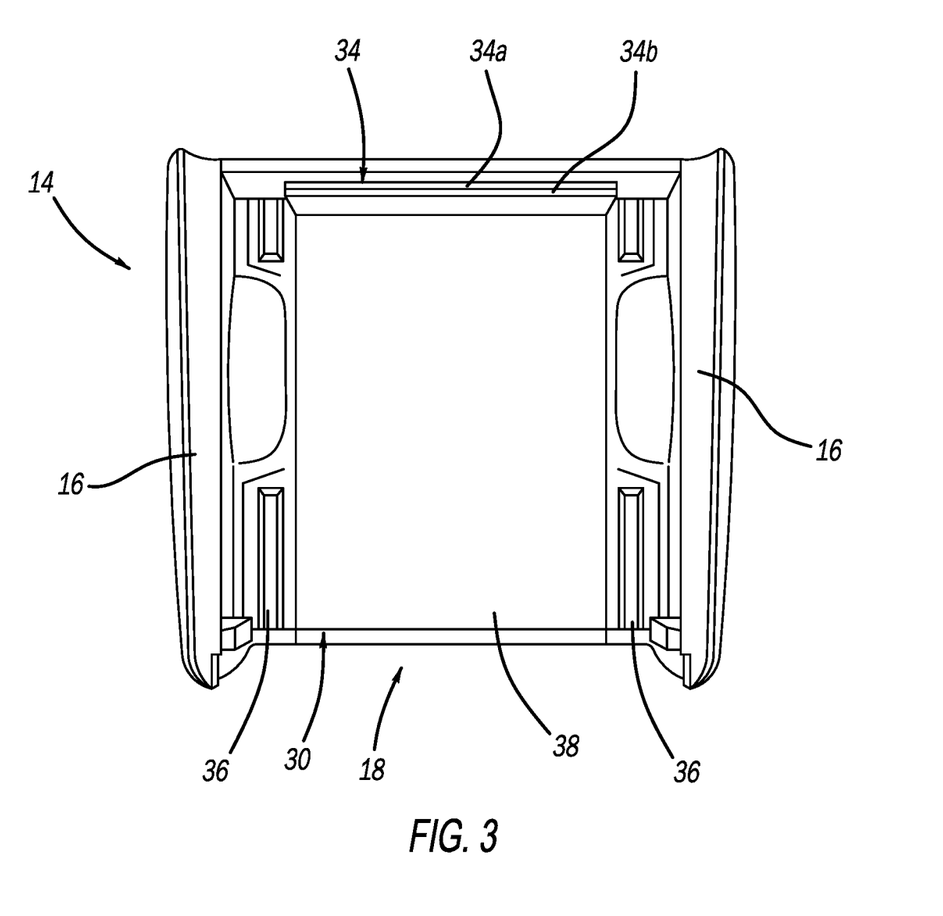
FIG. 3 is a top view of the platform assembly of FIG. 1 comprising the main section in the rest position.
Figure 4:
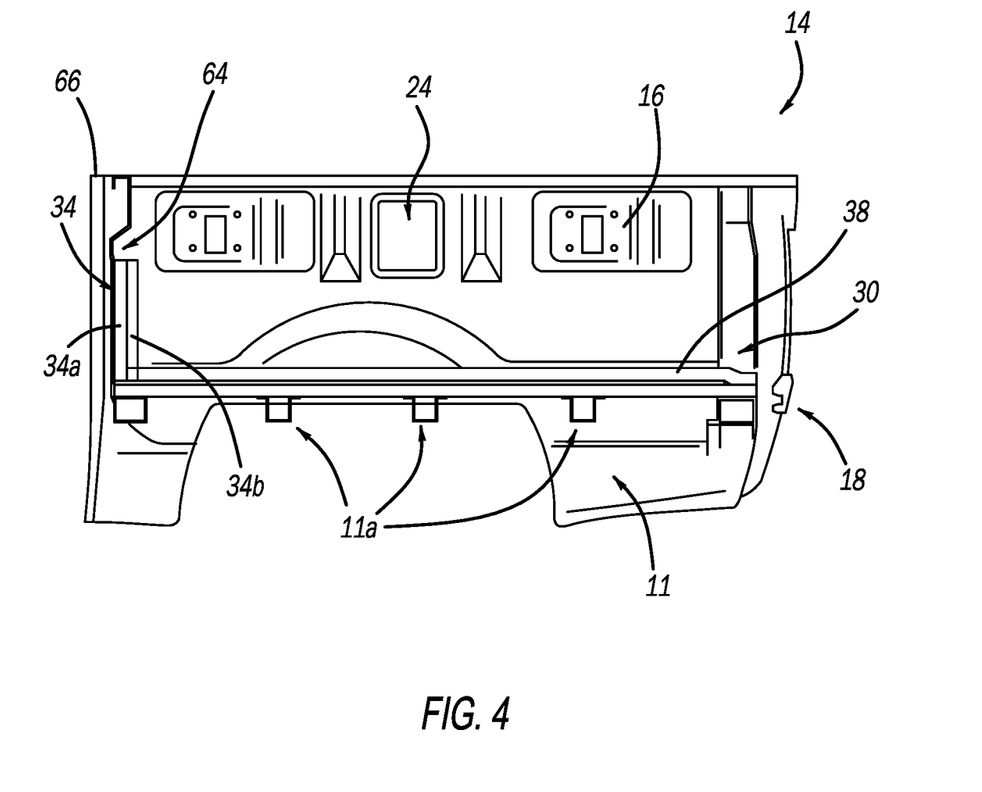
FIG. 4 is a cross-sectional view of the platform assembly of FIG. 1 comprising the main section in the rest position.
Figure 5:
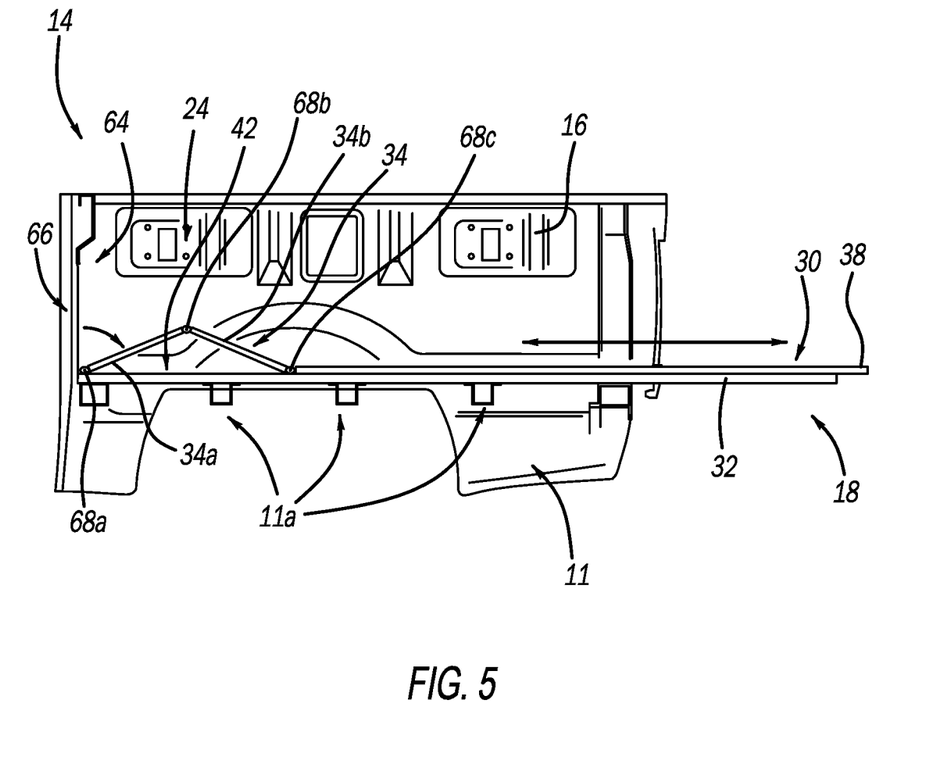
FIG. 5 is a cross-sectional view of the platform assembly of FIG. 1 comprising the main section being moved from the rest position toward an extended position.
Figure 6:
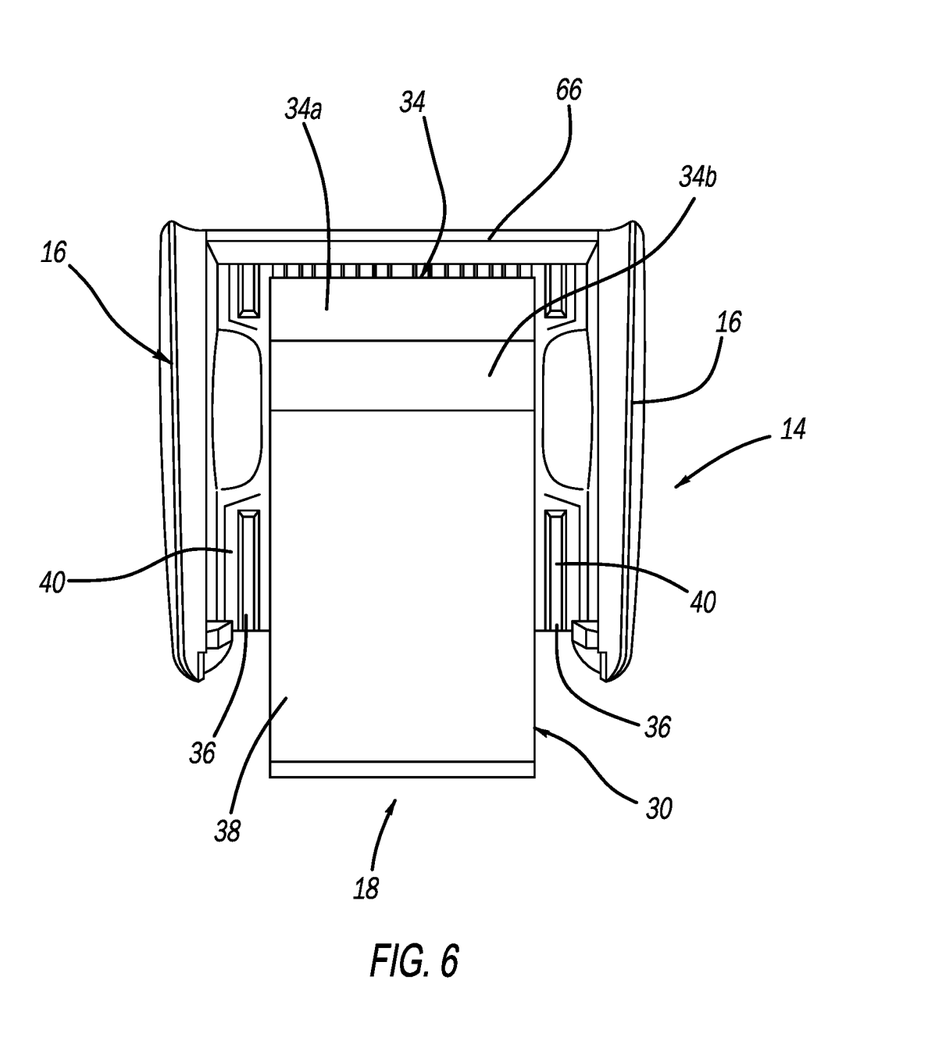
FIG. 6 is a top view of the platform assembly of FIG. 1 comprising the main section in the extended position.

With additional reference to FIGS. 2-8, in the example illustrated, the platform assembly 18 comprises a floor panel 30, a rail assembly 32 and a cover panel 34. The floor panel 30 defines a bottom of the cargo area 24 and supports cargo disposed in the cargo area 24. In the example illustrated, the floor panel 30 is mounted to a frame 11 of the vehicle 10 via cross bars 11a of the cargo bed 14 and comprises end sections 36 and a main section 38. The end sections 36 are mounted to the cross bars 11a of the cargo bed 14 that extend in a transverse direction of the vehicle 10. In some forms, the end sections 36 are mounted to the cross bars 11a and/or longitudinal extending rails 11b (FIG. 8) of the vehicle 10. In the example illustrated, the end sections 36 are disposed on opposing sides of the main section 38 and extend along an entire length of the cargo area 24. In the example illustrated, each end section 36 also comprises an integrated wheel well. In some forms, the floor panel 30 includes only one end section instead of a pair of end sections. In some forms, the end sections 36 are separate from the side walls 16 of the cargo bed 14 and are mechanically fastened to the side walls 16 of the cargo bed 14. In other forms, each end section 36 is integral with a respective side wall 16 of the cargo bed 14. As shown in FIGS. 2 and 6, the end sections 36 comprise ridges 40 extending in a longitudinal direction relative to a length of the floor panel 30. In some forms, the ridges 40 extend in a lateral direction relative to a length of the floor panel 30. The ridges 40 are stamped into the end sections 36 and are configured to provide rigidity to the end sections 36.

When the tailgate is in the open position, the main section 38 is slidable relative to the end sections 36 between a rest position (FIGS. 2-4) in which the main section 38 is entirely within the cargo area 24 of the vehicle 10 and an extended position (FIGS. 6 and 7) in which the main section 38 extends beyond the cargo area 24 of the vehicle 10 in a rearward direction, thereby exposing an opening 42 (FIG. 5) in the floor panel 30. When the main section 38 is in the extended position, cargo located on the main section 38 is accessible to an operator without climbing onto the cargo bed 14. In some forms, the main section 38 is a telescoping structure.

In the example illustrated, the main section 38 is located at a center of the floor panel 30 and is mounted to the cross bars 11a of the cargo bed 14 via the rail assembly 32. The main section 38 has a generally rectangular shape and is flush with the end sections 36. The end sections 36 inhibit the main section 38 from moving in a lateral direction relative to the vehicle 10. The main section 38 comprises a substantial area of the floor panel 30. As shown in FIG. 2, the main section 38 comprises ridges 44 extending in a longitudinal direction relative to a length of the floor panel 30. In some forms, the ridges 44 extend in a lateral direction relative to a length of the floor panel 30 in addition to, or instead of, extending in the longitudinal direction. The ridges 44 are stamped into the main section 38 and are configured to provide rigidity to the main section 38.

Figure 10:
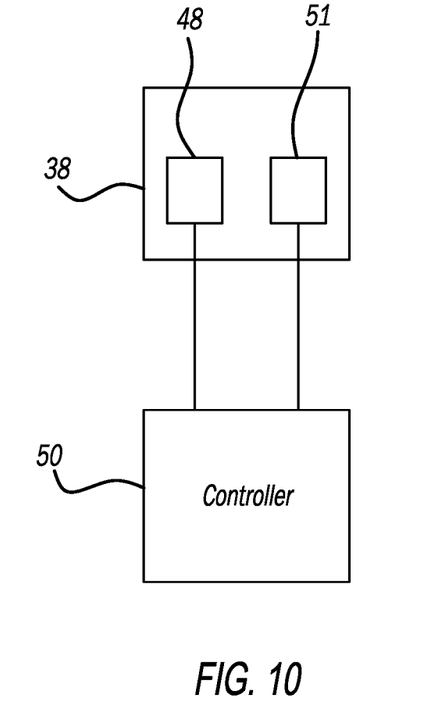
FIG. 10 is a schematic block diagram showing components of the platform assembly of FIG. 1.

As shown in FIG. 10, a latch assembly 48 is associated with the main section 38 and is moveable between a latched state in which the main section 38 is inhibited from sliding to the extended position and an unlatched state in which the main section 38 is allowed to slide to the extended position. The latch assembly 48 includes a first latch member secured to one of the main section 38 and the vehicle frame 11 and a second latch member secured to the other of the main section 38 and the vehicle frame 11. In one example, the first latch member is a hook and the second latch member is a groove. In the example illustrated, the latch assembly 48 is in electrical communication with a controller 50. In this way, the controller 50 is configured to cause the latch assembly 48 to move between the latched state and the unlatched state.

A motor assembly 51 is associated with the main section 38 and is operable to drive the main section 38 between the rest position and the extended position. In one example, the motor assembly 51 includes a drive mechanism and a motor. The drive mechanism can be a ball screw, a worm gear, a screw drive, or the like connected to the motor. In one example, the drive mechanism and the motor are secured to the vehicle frame 11 (e.g., the longitudinal extending rails 11b of the frame) and/or the cross bars 11a of the cargo bed 14. The drive mechanism is engaged with the main section 38 and operates to drive the main section 38 between the rest position and the extended position. The controller 50 is in electrical communication with the motor and is configured to cause the motor to drive the drive mechanism. It should be understood that the main section 38 can also be moved manually instead of, or in addition to, being driven by the motor assembly 51.

Figure 7:
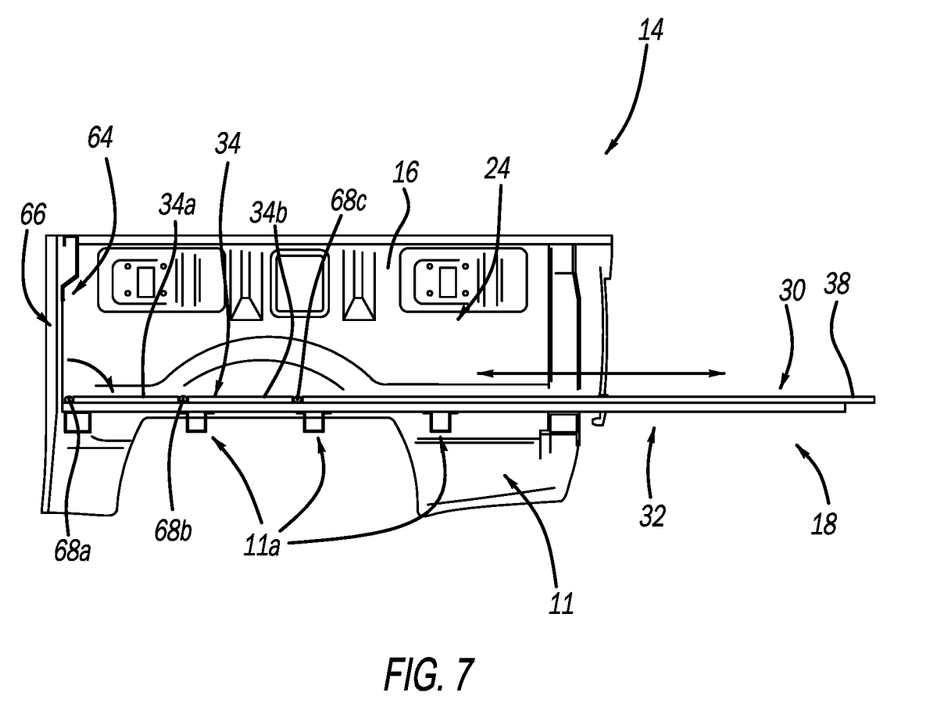
FIG. 7 is a cross-sectional view of the platform assembly of FIG. 1 comprising the main section in the extended position.
Figure 8:
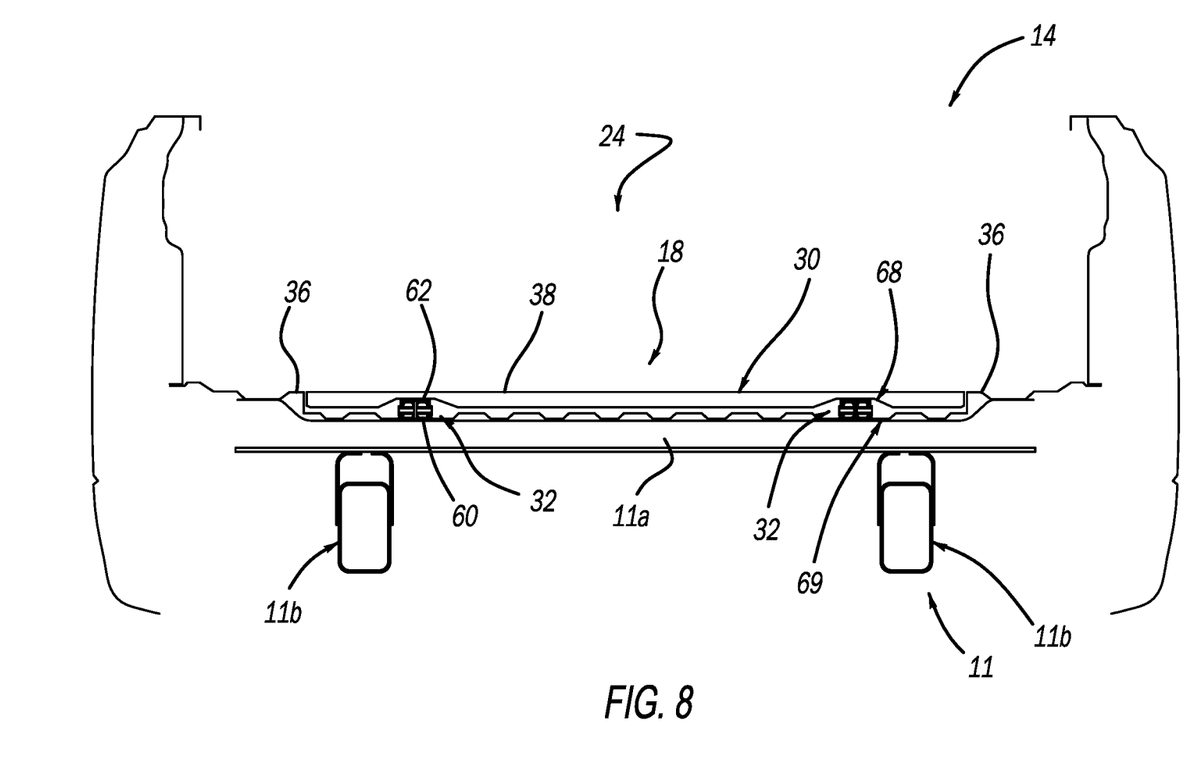
FIG. 8 is a cross-sectional view of the platform assembly of FIG. 1.

With reference to FIGS. 5, 7, and 8, the rail assembly 32 is associated with the vehicle frame 11 and the main section 38 and is positioned between the main section 38 and the vehicle frame 11. The rail assembly 32 is the structure that facilitates movement of the main section 38 between the rest position and the extended position. As shown in FIG. 8, the rail assembly 32 includes a plurality of first tracks 60 and a plurality of second tracks 62. The plurality of first tracks 60 are fixed to the cross bars 11a of the cargo bed 14 and extend in a longitudinal direction of the vehicle 10. In the example illustrated, the first tracks 60 are received in recesses 69 formed in the cross bars 11a, thus, improving packaging of the platform assembly 18. The second tracks 62 are mounted to an underside of the main section 38 and are received in respective first tracks 60. The second tracks 62 are also received in recesses 68 formed in the underside of the main section 38, thus, improving packaging of the platform assembly 18. In one example, the second tracks 62 are slidably received in the respective first tracks 60 such that the second tracks 62 slide relative to the first tracks 60. In another example, the second tracks 62 comprise wheels that are rollable within the first tracks 60.

The cover panel 34 is moveable between a stowed position (FIGS. 2-4) in which the cover panel 34 is disposed in a recess 64 formed in a front wall 66 of the cargo bed 14, and a deployed position (FIGS. 6 and 7) in which the cover panel 34 covers the opening 42 exposed in the floor panel 30. In the example illustrated, the cover panel 34 comprises a first end hinged to the cargo bed 14 or the vehicle frame 11, and a second end hinged to the main section 38 of the floor panel 30. In this way, when the main section 38 is in the rest position, the cover panel 34 is in the stowed position, and when the main section 38 is moved to the extended position, the cover panel 34 is simultaneously moved to the deployed position.

In the example illustrated, the cover panel 34 rotates between the stowed position and the deployed position. When the cover panel 34 is in the stowed position, the cover panel 34 is flush with the front wall 66 of the cargo bed 14, thereby giving the front wall 66 a natural appearance to an operator. When the cover panel 34 is in the deployed position, the cover panel 34 is flush or coplanar with the main section 38 and end sections 36 of the floor panel 30. The cover panel 34 is also supported by the rail assembly 32 and the cross bars 11a when the cover panel 34 is in the deployed position. In this way, the cover panel 34 can support cargo disposed thereon.

In the example illustrated, the cover panel 34 comprises a planar first panel 34a and a planar second panel 34b. The first panel 34a and the second panel 34b are in a stacked arrangement within the recess 64 when the cover panel 34 is in the stowed position, and are coplanar with each other when the cover panel 34 is in the deployed position. Stated differently, the first panel 34a and the second panel 34b are in a stacked arrangement when the cover panel is in the stowed position and are flush with the main section 38 of the floor panel 30 when the cover panel 34 is in the deployed position. The first and second panels 34a, 34b also extend in a vertical direction when the cover panel 34 is in the stowed position and extend in a horizontal direction when the cover panel 34 is in the deployed position.

Figure 9:
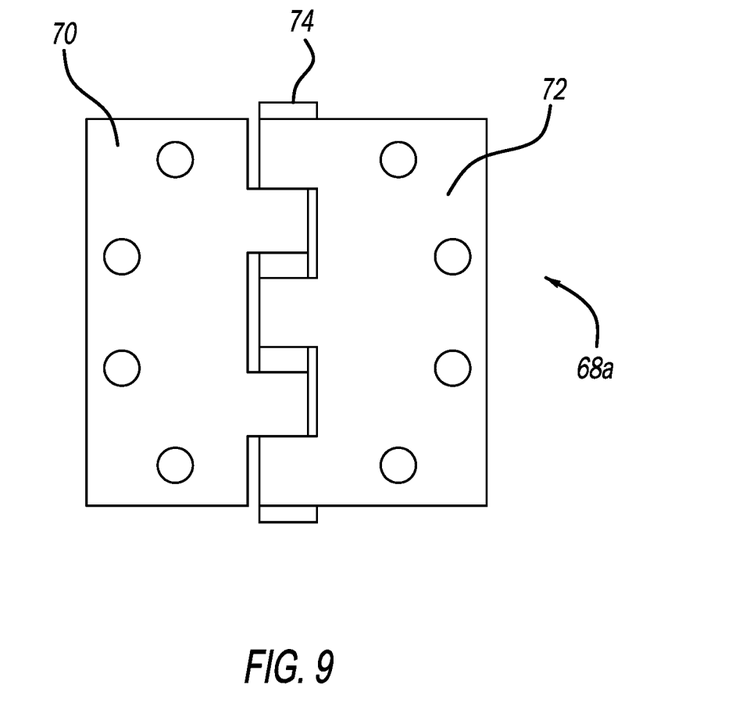
FIG. 9 is a perspective view of one hinge device for a cover panel of the platform assembly of FIG. 1.

The first panel 34a is hinged to the cargo bed 14 (or the vehicle frame 11) via hinge devices 68a (only one shown in the figures). An example hinge device 68a is shown in FIG. 9 including a first hinge member 70, a second hinge member 72, and a pivot pin 74. The first hinge member 70 is secured to the cargo bed 14 (or the vehicle frame 11) via mechanical fasteners, for example, and the second hinge member 72 is secured to the first panel 34a via mechanical fasteners, for example. The pivot pin 74 extends through the first and second hinge members 70, 72. The hinge device 68a is secured to the cargo bed 14 and the first panel 34a such that the hinge device 68a is hidden from view from a top side of the cover panel 34 when the cover panel 34 is in the deployed position. In one example, the hinge devices 68a comprise a pair of hinge devices disposed at opposing ends of the first panel 34a. In another example, the hinge devices 68a comprise a plurality of hinge devices disposed along a length of the first panel 34a.

The second panel 34b is hinged to the first panel 34a via hinge devices 68b (only one shown in the figures) and is hinged to the main section 38 via hinge devices 68c (only one shown in the figures). The structure and function of the hinge devices 68b, 68c are similar to the hinge devices 68a, therefore, will not be described again in detail. The movement of the first panel 34a and the second panel 34b when moving from the stowed position to the deployed position is similar to that of a bi-fold door system. One example of such bi-fold door system is disclosed in U.S. Pat. No. 3,811,489 which is incorporated herein by reference in its entirety.

The platform assembly 18 of the present disclosure provides the benefit of being the main floor structure of the cargo bed 14 as opposed to a separate structure mounted onto a floor of a cargo bed. The cover panel 34 of the platform assembly 18 of the present disclosure provides the benefit of covering the opening 42 exposed in the floor panel 34 when the main section 38 is moved to the extended position.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A platform assembly for a cargo area of a vehicle, the platform assembly comprising:
    a floor panel comprising a main section slidable between a rest position in which the main section is configured to be substantially within the cargo area of the vehicle and an extended position in which the main section is configured to extend beyond the cargo area of the vehicle, thereby exposing an opening in the floor panel; and
    a cover panel movable between a stowed position and a deployed position, the cover panel configured to cover the opening exposed in the floor panel when the main section is in the deployed position.

2. The platform assembly of claim 1, further comprising a rail assembly including a plurality of first tracks and a plurality of second tracks, and wherein the first tracks are configured to be fixed to cross bars underneath the floor panel and the second tracks are mounted to an underside of the main section and slidably received in respective first tracks.

3. The platform assembly of claim 2, wherein the underside of the main section defines grooves, and wherein the second tracks are disposed in respective grooves of the main section.

4. The platform assembly of claim 1, wherein the floor panel comprises end sections disposed on opposing sides of the main section, and wherein the main section is slidable relative to the end sections.

5. The platform assembly of claim 4, wherein the end sections are flush with the main section.

6. The platform assembly of claim 1, wherein the cover panel comprises a first panel and a second panel, and wherein the first panel is configured to be hinged to the vehicle and the second panel is hinged to the first panel and the main section.

7. The platform assembly of claim 6, wherein the first panel and the second panel are in a stacked arrangement when the cover panel is in the stowed position and are coplanar with each other when the cover panel is in the deployed position.

8. The platform assembly of claim 6, wherein the first panel and the second panel are in a stacked arrangement when the cover panel is in the stowed position and are flush with the main section when the cover panel is in the deployed position.

9. The platform assembly of claim 6, wherein the first and second panels extend in a vertical direction when the cover panel is in the stowed position and extend in a horizontal direction when the cover panel is in the deployed position.

10. The platform assembly of claim 1, further comprising a latch assembly associated with the main section and moveable between a latched state in which the main section is inhibited from sliding to the extended position and an unlatched state in which the main section is slidable to the extended position.

11. The platform assembly of claim 1, further comprising a motor assembly configured to drive the main section between the rest position and the extended position.

12. The platform assembly of claim 1, wherein the main section comprises elongated stiffening ridges.

13. A platform assembly for a cargo area of a vehicle, the platform assembly comprising:
    a floor panel comprising a main section slidable between a rest position in which the main section is configured to be substantially within the cargo area of the vehicle and an extended position in which the main section is configured to extend beyond the cargo area of the vehicle, thereby exposing an opening in the floor panel;
    a rail assembly including a plurality of first tracks and a plurality of second tracks, the first tracks are configured to be fixed to cross bars underneath the floor panel and the second tracks are mounted to an underside of the main section and slidably received in respective first tracks; and
    a cover panel hinged to the main section and rotatable between a stowed position and a deployed position, the cover panel configured to cover the opening exposed in the floor panel when the main section is in the deployed position.

14. The platform assembly of claim 13, wherein the floor panel comprises end sections disposed on opposing sides of the main section, and wherein the main section is slidable relative to the end sections.

15. The platform assembly of claim 13, wherein the cover panel comprises a first panel and a second panel, and wherein the first panel is configured to be hinged to the vehicle and the second panel is hinged to the first panel and the main section.

16. The platform assembly of claim 15, wherein the first panel and the second panel are in a stacked arrangement when the cover panel is in the stowed position and are coplanar with each other when the cover panel is in the deployed position.

17. The platform assembly of claim 15, wherein the first panel and the second panel are in a stacked arrangement when the cover panel is in the stowed position and are flush with the main section when the cover panel is in the deployed position.

18. The platform assembly of claim 15, wherein the first and second panels extend in a vertical direction when the cover panel is in the stowed position and extend in a horizontal direction when the cover panel is in the deployed position.

19. A vehicle comprising:
    a plurality of side walls defining a cargo area; and
    a platform assembly comprising:
        a floor panel comprising a main section slidable between a rest position in which the main section is substantially within the cargo area and an extended position in which the main section extends beyond the cargo area of the vehicle, thereby exposing an opening in the floor panel;
        a rail assembly including a plurality of first tracks and a plurality of second tracks, the first tracks are fixed to cross bars underneath the floor panel and the second tracks are mounted to an underside of the main section and slidably received in respective first tracks; and a cover panel movable between a stowed position and a deployed position, the cover panel configured to cover the opening exposed in the floor panel when the main section is in the deployed position.

20. The vehicle of claim 19, wherein one of the side walls includes a recess, and wherein the cover panel is located within the recess when the cover panel is in the stowed position.

\* \* \* \* \*